(12) United States Patent
Nitta

(10) Patent No.: US 8,576,428 B2
(45) Date of Patent: Nov. 5, 2013

(54) IMAGE FORMING APPARATUS FORMS AN OUTPUT IMAGE FROM AN IMAGE-REPEATED IMAGE

(75) Inventor: Tsuyoshi Nitta, Osaka (JP)

(73) Assignee: Kyocera Document Solutions Inc. (JP)

( * ) Notice: Subject to any disclaimer, the term of this patent is extended or adjusted under 35 U.S.C. 154(b) by 464 days.

(21) Appl. No.: 12/728,563

(22) Filed: Mar. 22, 2010

(65) Prior Publication Data

US 2010/0245906 A1  Sep. 30, 2010

(30) Foreign Application Priority Data

Mar. 27, 2009  (JP) ................................ 2009-079787
Jul. 16, 2009   (JP) ................................ 2009-168032

(51) Int. Cl.
G06F 3/12   (2006.01)
G06F 17/00  (2006.01)
G06K 15/00  (2006.01)
G06K 15/02  (2006.01)
H04N 1/60   (2006.01)

(52) U.S. Cl.
USPC ......... 358/1.15; 358/1.16; 358/1.18; 358/1.2; 358/1.9; 715/241; 715/274; 715/800; 715/838

(58) Field of Classification Search
USPC ........ 358/1.15, 1.1, 1.16, 1.18, 450, 1.9, 458, 358/1.2, 498, 3.12, 2.1, 3.23, 501, 523, 537, 358/540, 302; 399/45, 59, 2, 6, 60, 72, 81, 399/130, 160, 183, 361, 372, 373, 386, 399/394; 715/200, 831, 838, 815, 800, 793, 715/790, 274, 273, 252, 243, 240, 241, 242, 715/244, 245, 246, 247
See application file for complete search history.

(56) References Cited

U.S. PATENT DOCUMENTS

| | | | |
|---|---|---|---|
| 2004/0150856 A1* | 8/2004 | Asai | 358/1.18 |
| 2005/0278331 A1 | 12/2005 | Hatori | 707/7 |
| 2009/0002732 A1* | 1/2009 | Shirata | 358/1.9 |
| 2010/0149566 A1* | 6/2010 | Chimura | 358/1.9 |

FOREIGN PATENT DOCUMENTS

| | | |
|---|---|---|
| JP | 2000-078395 | 3/2000 |
| JP | 2003-060885 | 2/2003 |
| JP | 2004-248262 | 9/2004 |
| JP | 2005-352701 | 12/2005 |
| JP | 2008-022489 | 1/2008 |
| JP | 2010-147655 | 7/2010 |

OTHER PUBLICATIONS

Toyoda Masaaki, Device, Method and Program for Editing image and Image Forming Device, Feb. 28, 2003, Machine Translated Japanese Patent Application, JP2003060885, all pages.*

* cited by examiner

*Primary Examiner* — Ngon Nguyen
(74) *Attorney, Agent, or Firm* — Ostrolenk Faber LLP

(57) ABSTRACT

An image forming apparatus includes an output image forming unit that forms an output image from an image-repeat image which is obtained by arranging a plurality of input images on one recording medium based on predetermined repeat conditions, a preview image generating unit that generates reduced images of the input images, sets arrangement positions of the reduced images based on the repeat conditions, and arranges the reduced images in the arrangement positions in accordance with the repeat conditions, thereby generating a preview image, and a display unit that displays the preview image generated by the preview image generating unit.

3 Claims, 7 Drawing Sheets

IMAGE FORMING APPARATUS FORMS AN OUTPUT IMAGE FROM AN IMAGE-REPEATED IMAGE

BACKGROUND OF THE INVENTION

1. Field of the Invention

The present invention relates to an image forming apparatus.

Priority is claimed on Japanese Patent Application No. 2009-079787, filed Mar. 27, 2009 and Japanese Patent Application No. 2009-168032, filed Jul. 16, 2009, the contents of which are incorporated herein by reference.

2. Description of Related Art

An image forming apparatus such as a copy machine or a multifunctional device has a function for image-repeat printing. According to the image-repeat printing, an image (original document image) of one sheet of an original document read by a scanner is printed on one sheet of a recording paper a number of times (the number of repeats) designated by a user. Further, according to the image-repeat printing, a variable magnification process is performed with respect to the original document image to generate an image for image-repeat, the image is mapped to a data storage area by the number of repeats to generate a printing image (image-repeat image) corresponding to one sheet of the recording paper, and the image-repeat image is printed on the recording paper. For example, Japanese Patent Application, First Publication No. 2004-248262 discloses one example of the related art for the above-described image-repeat printing.

Further, the image forming apparatus has a function of preview-displaying the printing image on a display in order to check in advance the image to be printed. According to the preview-display, when the original document image is read, reduced images (thumbnail) are generated by reducing the original document image at a predetermined reduction ratio, and the thumbnail images are displayed on the display as a preview image. In general, since the size of the display is smaller than that of the recording paper, after thumbnail images having a size smaller than that of the original document image are generated, the thumbnail images are used for the preview-display. The above preview-display is disclosed in detail in Japanese Patent Application, First Publication No. 2000-078395.

Meanwhile, the preview image in the image-repeat printing is generated by mapping the thumbnail images by the number of repeats such that they are adjacent to each other but do not overlap with each other. That is, in the image-repeat printing, an image-repeat image and a preview image, which are actually provided for printing, have a difference therebetween. That is, the former is generated based on the original document image and the latter is generated based on the thumbnail images obtained by reducing the original document image.

However, when thumbnail images are generated by reducing the original document image at the predetermined reduction ratio, a difference may occur between the preview image and the image-repeat image due to a calculation error in the image forming apparatus. In particular, if the number of repeats is increased, the above difference also increases, so differences between each repeat may occur between the preview image and the image-repeat image. That is, if the size of the thumbnail images includes a calculation error with respect to the size of the original document image, when the thumbnail images are arranged so as to be adjacent to each other without overlapping each other, a part of the preview image may be broken at an end portion thereof or a white space may occur. Due to such a difference between the preview image and the image-repeat image in the image-repeat printing, significant technical problems remain in the image forming apparatus, since the preview image may lose the original quality.

SUMMARY OF THE INVENTION

In light of such circumstances, it is an object of the present invention to obtain a preview image which is more faithful to an image-repeat image in image-repeat printing.

(1) To achieve the above object, according to a first aspect of the invention, there is provided an image forming apparatus including: an output image forming unit that forms an output image from an image-repeat image which is obtained by arranging a plurality of input images on one recording medium based on predetermined repeat conditions; a preview image generating unit that generates reduced images of the input images, sets arrangement positions of the reduced images based on the repeat conditions, and arranges the reduced images in the arrangement positions in accordance with the repeat conditions, thereby generating a preview image; and a display unit that displays the preview image generated by the preview image generating unit.

(2) According to the image forming apparatus of the first aspect, an image storage unit is further provided to store the reduced images generated by the preview image generating unit when the input images are received, and the preview image generating unit reads the reduced images from the image storage unit to generate the preview image if display instructions for the preview image are received.

(3) According to the image forming apparatus of the first aspect, the output image forming unit generates the output image after the preview image is generated.

(4) According to a second aspect of the invention, there is provided an image forming apparatus including: an image-repeat image generating unit that generates an image-repeat image by arranging a plurality of input images in a printing image area such that the input images are located close to each other but do not overlap with each other, and forms the image-repeat image on one recording medium based on predetermined printing conditions; a preview image generating unit that generates a preview image by generating reduced images of the input images, and arranging the reduced images in a preview image area such that the reduced images are located close to each other but do not overlap with each other based on the printing conditions; and a display unit that displays the preview image generated by the preview image generating unit.

(5) According to the image forming apparatus of the second aspect, when the size of the preview image is different from the size of the preview image area, the preview image generating unit adjusts the size of the preview image so as to coincide with the size of the preview image area.

(6) According to the image forming apparatus of the second aspect, an image storage unit is further provided to store the reduced images generated by the preview image generating unit when the input images are received, wherein the preview image generating unit reads the reduced images from the image storage unit to generate the preview image if display instructions for the preview image are received.

(7) According to the image forming apparatus of the second aspect, the image-repeat image generating unit generates the image-repeat image after the preview image is generated.

EFFECT OF THE INVENTION

According to the present invention, after the arrangement positions of the reduced images are set based on layout information, the reduced images are arranged in the arrangement positions according to the layout information, so that the preview image can be more faithful to the image-repeat image in the image-repeat printing, differently from the arrangement of the reduced images based on the size of the reduced images according to the related art. That is, according to the present invention, since a part of the preview image is not broken at an end portion thereof or a white space does not occur differently from the related art, the faithfulness of the preview image with respect to the image-repeat image can be improved.

Further, according to the present invention, the preview image is generated by arranging the reduced images of the original document image in the preview image area such that they are located close to each other but do not overlap with each other based on the printing conditions used for the generation of the image-repeat image, so that the preview image displayed during the image-repeat printing can be more faithful to the image-repeat image.

BRIEF DESCRIPTION OF THE DRAWINGS

FIG. 4A is a schematic diagram illustrating a preview image in image-repeat printing according to the first embodiment of the present invention.

FIG. 4B is a schematic diagram illustrating a preview image in image-repeat printing according to the related art.

DESCRIPTION OF THE PREFERRED EMBODIMENTS

Hereinafter, each embodiment of the present invention will be described with reference to the accompanying drawings.

First Embodiment

Figure 1:
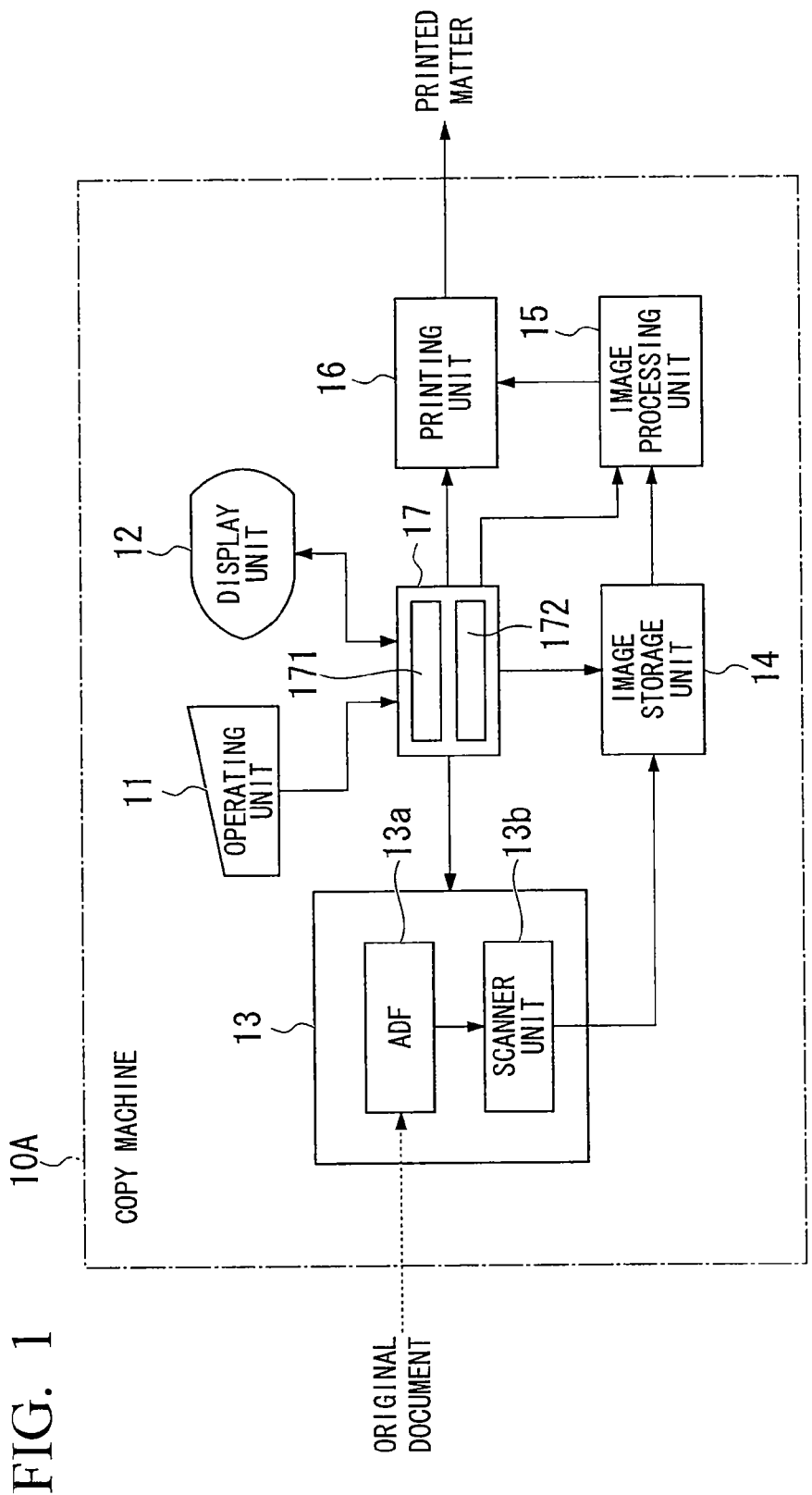
FIG. 1 is a block diagram illustrating the configuration of a copy machine 10A according to a first embodiment of the present invention.

First, a first embodiment of the present invention will be described. As illustrated in FIG. 1, a copy machine 10A according to the present embodiment includes an operating unit 11, a display unit 12, an image reading unit 13, an image storage unit 14, an image processing unit 15, a printing unit 16 and a control unit 17.

The operating unit 11 includes hard keys or soft keys displayed on a touch panel to receive various instructions from a user, and outputs operation signals representing the instructions to the control unit 17.

The display unit 12 is provided as a liquid crystal panel to display various images based on a control signal received from the control unit 17. As one of the images displayed on the display unit 12, there is a preview image corresponding to the features of the copy machine 10A. The image reading unit 13 includes an ADF (Auto Document Feeder) 13a and a scanner unit 13b as illustrated in FIG. 1. The image reading unit 13 allows an original document loaded on an original document tray to be automatically sent through the ADF 13a based on the control signal received from the control unit 17, reads an image (original document image) formed on the surface of the original document through the scanner unit 13b, and outputs image data (original document image data) representing the original document image to the image storage unit 14.

The image storage unit 14 stores the original document image data based on the control signal received from the control unit 17, and stores image data (thumbnail image data) of reduced images (thumbnail images), which is generated by the control unit 17 as a preview image, in association with the original document image data during the storage of the original document image data. Further, the image storage unit 14 reads the original document image data to output the read data to the image processing unit 15, and outputs the thumbnail image data to the control unit 17 based on the control signal received from the control unit 17.

The image processing unit 15 performs various processes such as an image-repeat process or a variable magnification process with respect to the original document image data, and converts image data (RGB image data) having experienced the processes into image data (YMCK image data) in a printing format based on the control signal received from the control unit 17. The image processing unit 15 outputs the image data in the printing format to the printing unit 16. The printing unit 16 forms (prints) the original document image on the surface of a recording paper (recording medium) based on the control signal received from the control unit 17. The printing unit 16 includes a paper feeding mechanism, an image transfer mechanism using an electrophotographic method, or a fixing mechanism for fixing the original document image transferred to the recording paper.

Further, the control unit 17 comprehensively controls the entire operation of the copy machine 10A based on a control program. Further, the control unit 17 performs a process of generating the preview image corresponding to the features of the copy machine 10A. The process of generating the preview image will be described in detail later. In brief, the control unit 17 generates the preview image by using the thumbnail image data stored in the image storage unit 14.

In detail, the control unit 17 includes an output image forming unit 171 and a preview image generating unit 172.

The output image forming unit 171 forms an output image from an image-repeat image which is obtained by arranging a plurality of input images from the image reading unit 13 on one sheet of the recording medium based on predetermined repeat conditions.

The preview image generating unit 172 generates reduced images of the input images, sets arrangement positions of the reduced images based on the repeat conditions, and arranges the reduced images in the arrangement positions in accordance with the repeat conditions, thereby generating the preview image.

The display unit 12 displays the preview image generated by the preview image generating unit 172.

When the input images are received from the image reading unit 13, the image storage unit 14 stores the reduced images generated by the preview image generating unit 172.

When display instructions for the preview image are received from the operating unit 11, the preview image generating unit 172 reads the reduced images from the image storage unit 14 to generate the preview image.

The output image forming unit 171 generates the output image after the preview image is generated by the preview image generating unit 172.

Figure 2:
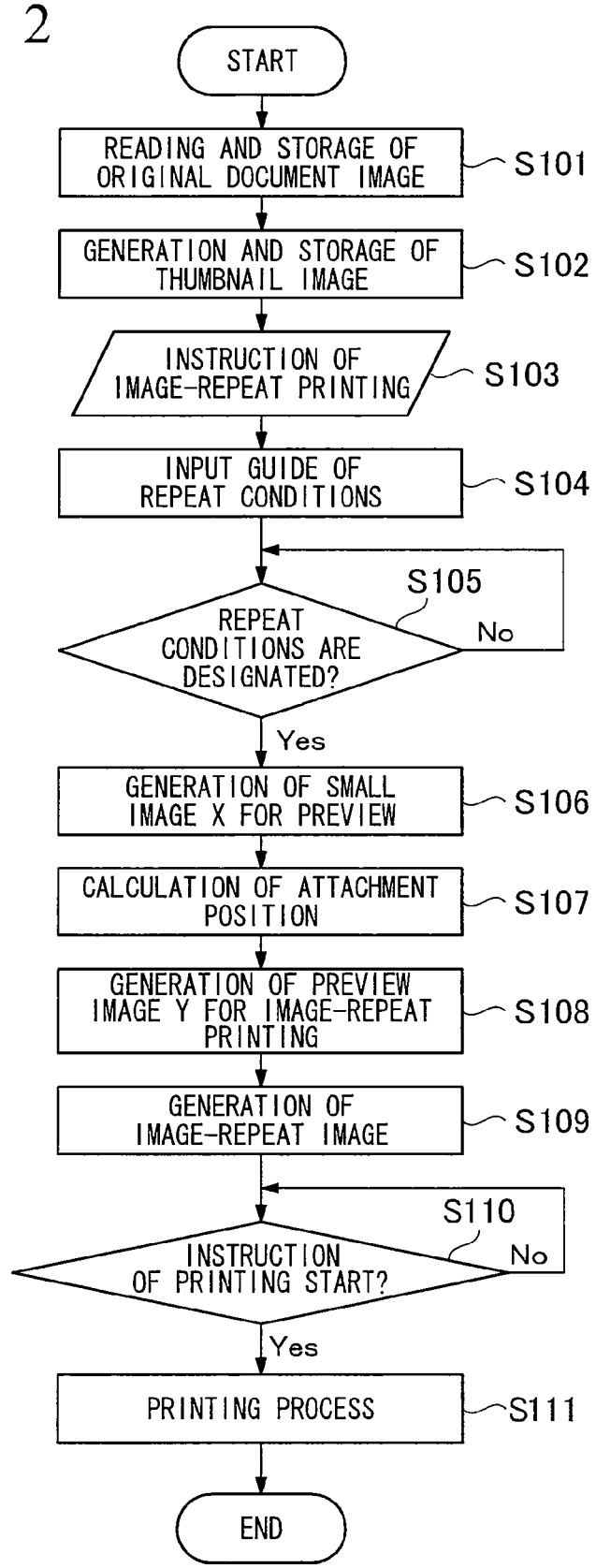
FIG. 2 is a flowchart illustrating the generation sequence of a preview image in image-repeat printing according to the first embodiment of the present invention.

Next, the main operation of the copy machine 10A having the above configuration, that is, a method for generating the preview image (preview image Y for image-repeat printing) in the image-repeat printing will be described with reference to the flowchart of FIG. 2.

If a user sets an original document on the original document tray of the image reading unit 13 and presses a reading start button of the operating unit 11, the control unit 17 outputs a control signal including instructions for the reading of the original document to the image reading unit 13 so that the image reading unit 13 reads the image (original document image) formed on the surface of the original document. Further, the control unit 17 outputs a control signal including instructions for the storage of the original document image data to the image storage unit 14 so that the image storage unit 14 stores the data (original document image data) of the original document (Step S101). That is, if the control signal is received from the control unit 17, the image reading unit 13 allows the original document to be automatically sent through the ADF 13a and the original document image to be read by the scanner unit 13b. Further, the image reading unit 13 outputs the data (original document image data) of the original document image to the image storage unit 14, so that the image storage unit 14 stores the original document image data received from the image reading unit 13.

Then, if the original document image data is stored in the image storage unit 14, the control unit 17 generates data (thumbnail image data) of reduced images (thumbnail images) obtained by reducing the original document image at a predetermined reduction ratio, and outputs a control signal including instructions for the storage of the thumbnail image data to the image storage unit 14, so that the thumbnail image data is stored in the image storage unit 14 in association with the original document image data (Step S102).

Herein, after pressing the reading start button, if the user directs image-repeat printing through the operating unit 11 (Step S103), the control unit 17 displays the thumbnail images on the display unit 12 as the preview image, and displays a caption indicating the input of repeat conditions on the display unit 12 (Step S104). Thus, the user operates the operating unit 11 to establish the repeat conditions which include the start point (upper left vertex) and the end point (lower right vertex) of an image area (rectangular area), which serves as an object of the image-repeat printing with respect to the thumbnail images (i.e., the reduced images of the original document image) displayed on the display unit 12, and magnification for the size of the original document.

If the repeat conditions are received in the operating unit 11 (Step S105), the control unit 17 generates images (preview child images X), which are obtained by enlarging or reducing the image (image to be repeated) of the rectangular area designated by the start point and the end point of the repeat conditions according to the magnification, based on the thumbnail images (Step S106). In addition, the control unit 17 calculates attachment positions of the preview child images X based on the repeat conditions (Step S107), sequentially attaches the preview child images X to the attachment positions to generate the preview image Y for the image-repeat printing, and displays the preview image Y on the display unit 12 (Step S108).

Figure 3:
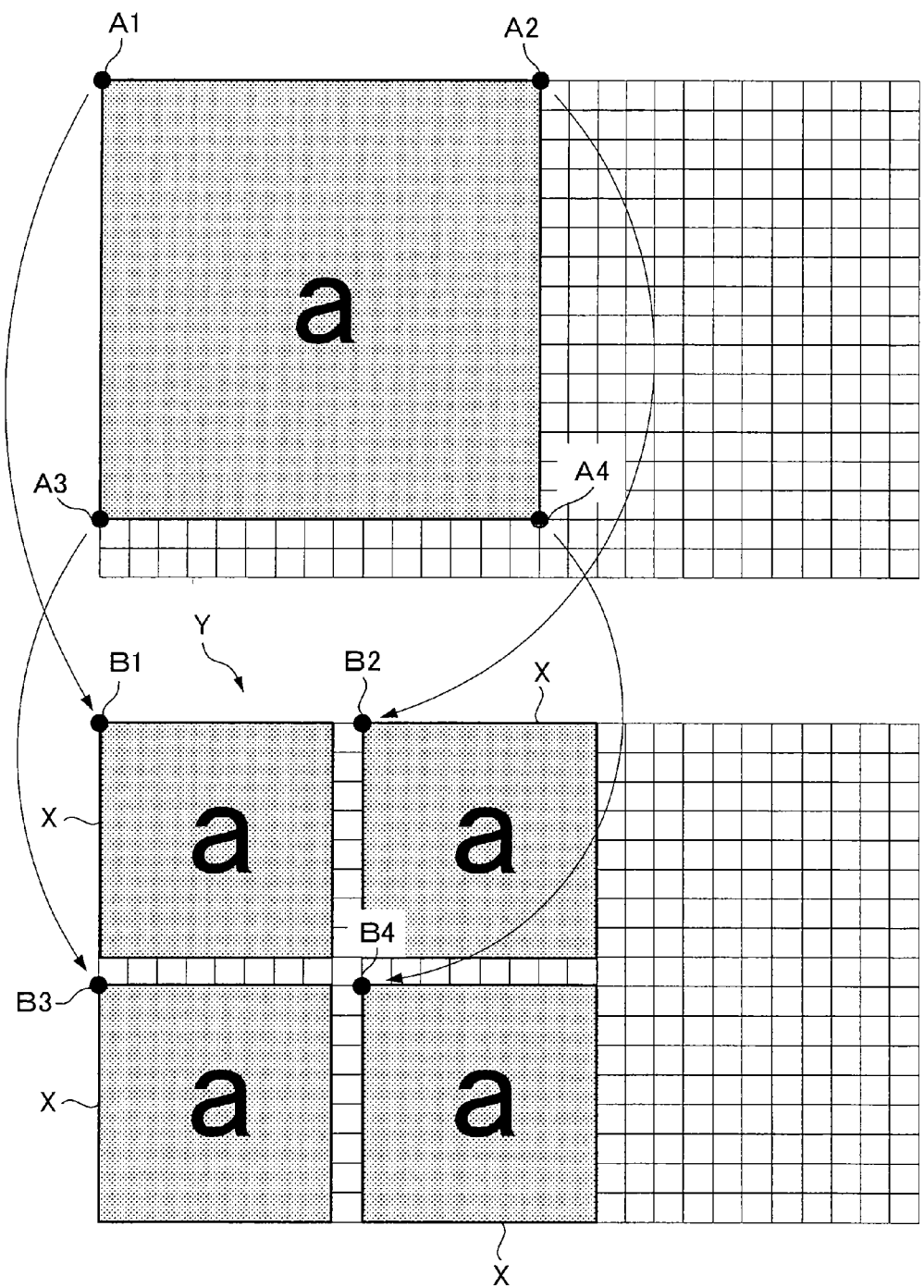
FIG. 3 is a schematic diagram illustrating the generation method of a preview image in image-repeat printing according to the first embodiment of the present invention.

FIG. 3 is a schematic diagram illustrating the processes of Steps S107 and S108. In FIG. 3, A1 to A4 indicate vertexes of the image to be repeated in the preview image based on the thumbnail images. Among the vertexes A1 to A4, the upper left vertex A1 is the start point of the rectangular area designated as the repeat conditions and the lower right vertex A4 is the end point of the rectangular area designated as the repeat conditions.

That is, the control unit 17 calculates the coordinates of the other two vertexes A2 and A3 of the rectangular area based on the coordinates of the start point A1 and the coordinates of the end point A4, which are designated by a user as the repeat conditions. Further, the control unit 17 calculates the coordinates of upper left vertexes B1 to B4 of the preview child images X in the preview image Y for the image-repeat printing based on the coordinates of the vertexes A1 to A4 and the magnification designated as the repeat conditions, and sequentially attaches the preview child images X based on the upper left vertexes B1 to B4.

As described above, the upper left vertexes B1 to B4 of the preview child images X are defined only by the repeat conditions regardless of the size of the thumbnail images. Thus, as illustrated in FIG. 3, a slight gap may be formed between the preview child images X, or the preview child images X may overlap with each other. However, such a gap or overlapping corresponds to the degree of a calculation error when the thumbnail images are generated, and is not highly visible in the preview image Y for the image-repeat printing.

When the preview image Y for the image-repeat printing generated by the control unit 17 is displayed on the display unit 12, a user directs the start of printing through the operating unit 11 if the preview image Y for the image-repeat printing coincides with the intention of the user.

If the instructions for the start of the printing are received in the operating unit 11 (Step S109), the control unit 17 outputs a control signal, which includes instructions for the generation of the image-repeat image based on the original document image stored in the image storage unit 14 and the repeat conditions received in the operating unit 11, to the image processing unit 15, thereby controlling the image-repeat image to be generated (Step S110).

If the control signal is received from the control unit 17, the image processing unit 15 generates a child image for image-repeat based on the original document image read from the image storage unit 14 and the repeat conditions received from the control unit 17 as the control signal, and generates the image-repeat image by arranging the child image for the image-repeat such that they are located adjacent to each other but do not overlap with each other, and outputs the image-repeat image to the printing unit 16. Then, the control unit 17 outputs a control signal, which includes instructions for the execution of printing, to the printing unit 16, so that the printing unit 16 executes the printing based on the image-repeat image (Step S111).

Figures 4A, 4B:
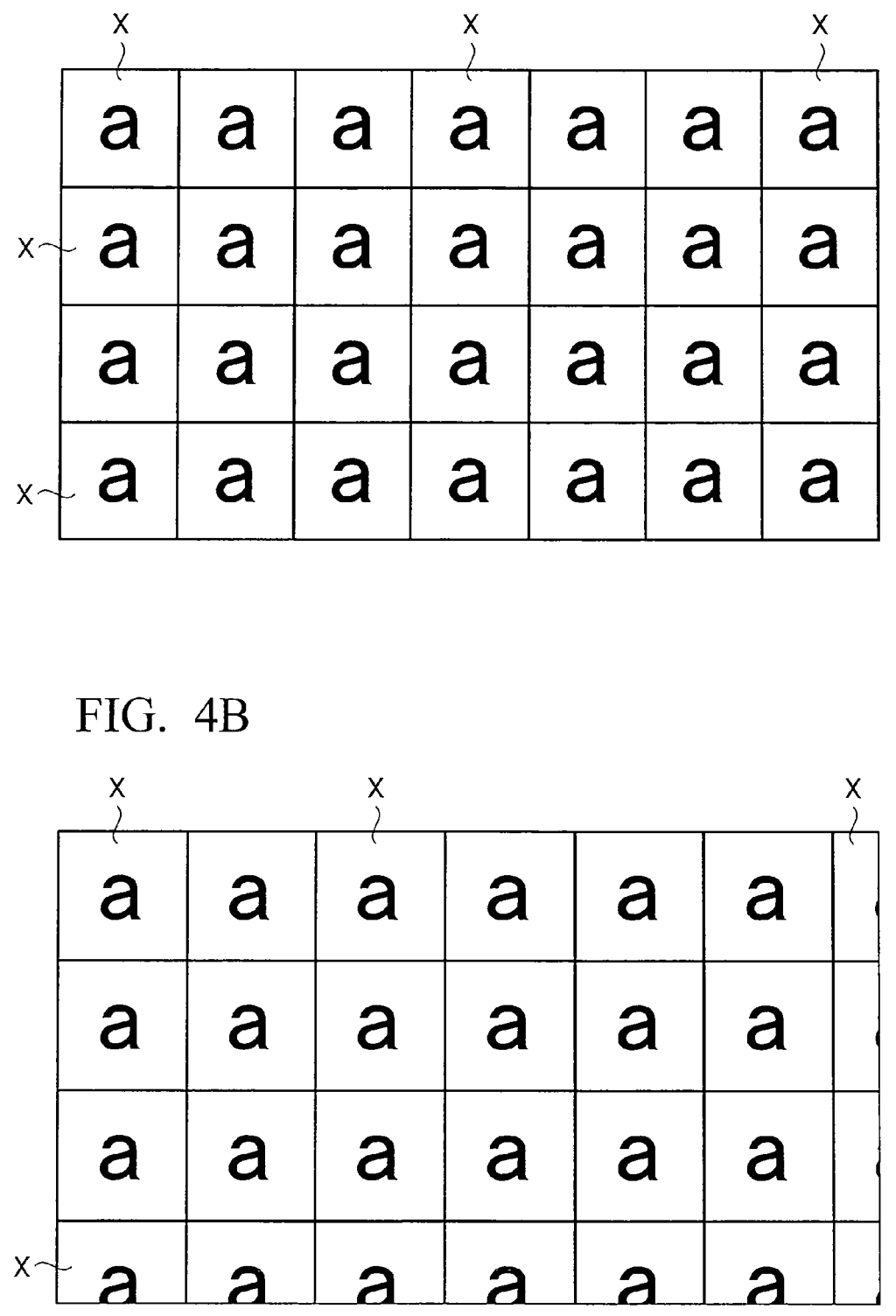

According to the present embodiment as described above, in the above-described method of generating the preview image Y for the image-repeat printing, although the size of the preview child images X generated based on the thumbnail images is slightly different from that of the child images for the image-repeat in the image-repeat image, which is generated based on the original document image and the repeat conditions, due to the calculation error having occurred when the thumbnail images are generated, the preview image Y for the image-repeat printing is faithful to the image-repeat image as illustrated in FIG. 4A as compared with that of the related art.

In the case of arranging the preview child images X based on the thumbnail images by using the same arrangement method as that of the child images for the image-repeat in the image-repeat image according to the related art, a part of the preview child images X may be cut in the right end and the lower end which are the farthest away from the upper left reference point (reference position of image forming) as illustrated in FIG. 4B. Further, if the number of the preview child images X is increased, the number of the preview child images X in the horizontal direction or the vertical direction may be different from the number of the image-repeat images.

The present invention is not limited to the previous embodiment. For example, the following modified examples can be made.

(1-1) According to the previous embodiment, the start point (upper left vertex) and the end point (lower right vertex) of the image area (rectangular area), which serves as the object of the image-repeat printing, and the magnification for the size of the original document are employed as the repeat conditions. However, the present invention is not limited thereto. For example, the number of images to be repeated in the vertical direction or the horizontal direction of the recording paper may be employed as the repeat conditions.

(1-2) According to the previous embodiment, the image-repeat image provided for the printing is generated after the preview image Y for the image-repeat printing provided for the preview display is generated. However, the generation sequence of the two images is not limited thereto.

(1-3) Further, according to the previous embodiment, after the preview child images X are generated, the attachment positions of the preview child images X are calculated. However, the calculation sequence thereof is not limited thereto.

Second Embodiment

Next, the second embodiment of the present invention will be described. Hereinafter, a copy machine will be used as an example of the image forming apparatus according to the present invention.

Figure 5:
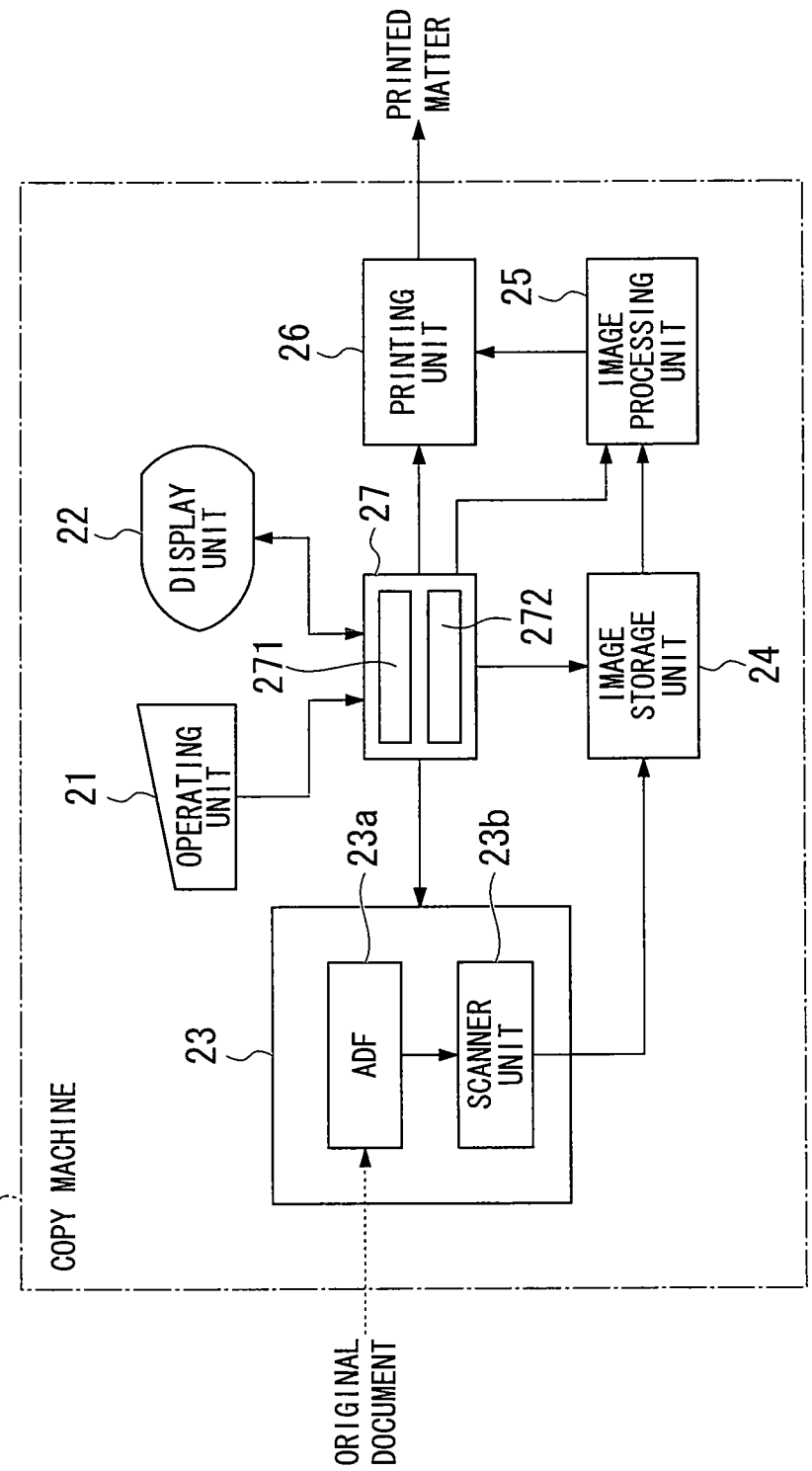
FIG. 5 is a block diagram illustrating the configuration of a copy machine 20A according to a second embodiment of the present invention.

FIG. 5 is a block diagram illustrating the copy machine 20A according to the present embodiment. As illustrated in FIG. 5, the copy machine 20A according to the present embodiment includes an operating unit 21, a display unit 22, an image reading unit 23, an image storage unit 24, an image processing unit 25, a printing unit 26 and a control unit 27.

The operating unit 21 includes hard keys or soft keys displayed on a touch panel, receives various instructions from a user, and outputs an operation signal representing the instructions to the control unit 27. The display unit 22 is provided as a liquid crystal panel to display various images based on a control signal received from the control unit 27. As one of the images displayed on the display unit 22, there is a preview image corresponding to the features of the copy machine 20A. The image reading unit 23 includes an ADF (Auto Document Feeder) 23a and a scanner unit 23b as illustrated in FIG. 5. The image reading unit 23 allows an original document loaded on an original document tray to be automatically sent through the ADF 23a based on the control signal received from the control unit 27, reads an image (original document image) formed on the surface of the original document through the scanner unit 23b, and outputs image data (original document image data) representing the original document image to the image storage unit 24.

The image storage unit 24 stores the original document image data based on the control signal received from the control unit 27, and stores image data (thumbnail image data) of reduced images (thumbnail images), which are generated as a preview image by the control unit 27, in association with the original document image data during the storage of the original document image data. Further, the image storage unit 24 reads the original document image data to output the read data to the image processing unit 25, and outputs the thumbnail image data to the control unit 27 based on the control signal received from the control unit 27.

The image processing unit 25 performs various processes such as an image-repeat process or a variable magnification process with respect to the original document image data, and converts image data (RGB image data) after the processes into image data (YMCK image data) in a printing format based on the control signal received from the control unit 27. The image processing unit 25 outputs the image data in the printing format to the printing unit 26. The printing unit 26 forms (prints) the original document image on the surface of a recording paper (recording medium) based on the control signal received from the control unit 27. The printing unit 26 includes a paper feeding mechanism, an image transfer mechanism using an electrophotographic method or a fixing mechanism for fixing the original document image transferred to the recording paper.

Further, the control unit 27 comprehensively controls the entire operation of the copy machine 20A based on a control program. Further, the control unit 27 performs a process of generating the preview image corresponding to the features of the copy machine 20A. The process of generating the preview image will be described in detail later. However, the control unit 27 generates the preview image by using the thumbnail image data stored in the image storage unit 24.

Figure 6:
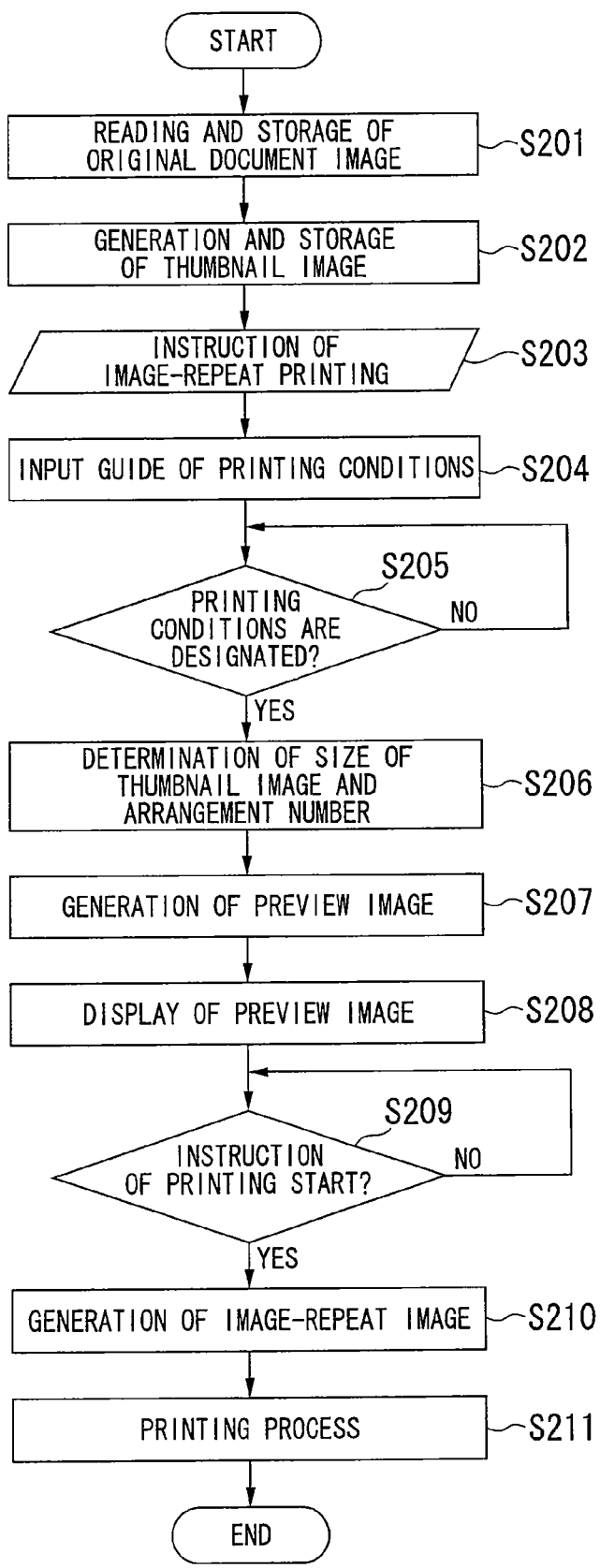
FIG. 6 is a flowchart illustrating the generation sequence of a preview image in image-repeat printing according to the second embodiment of the present invention.

Next, the main operation of the copy machine 20A having the above configuration, that is, a method for generating the preview image (preview image Y for image-repeat printing) in the image-repeat printing will be described with reference to the flowchart of FIG. 6.

If a user sets an original document on the original document tray of the image reading unit 23 and presses a reading start button of the operating unit 21, the control unit 27 outputs a control signal including instructions for the reading of the original document to the image reading unit 23 so that the image reading unit 23 reads the image (original document image) formed on the surface of the original document. Further, the control unit 27 outputs a control signal including instructions for the storage of the original document image data to the image storage unit 24 so that the image storage unit 24 stores the data (original document image data) of the original document (Step S201). That is, if the control signal is received from the control unit 27, the image reading unit 23 allows the original document to be automatically sent through the ADF 23a and the original document image to be read by the scanner unit 23b. Further, the image reading unit 23 outputs the data (original document image data) of the original document to the image storage unit 24, so the image storage unit 24 stores the original document image data received from the image reading unit 23.

Then, if the original document image data is stored in the image storage unit 24, the control unit 27 generates data (thumbnail image data) of reduced images (thumbnail images) obtained by reducing the original document image at a predetermined reduction ratio, and outputs a control signal including instructions for storage of the thumbnail image data to the image storage unit 24, so that the thumbnail image data is stored in the image storage unit 24 in association with the original document image data (Step S202).

Herein, after pressing the reading start button, if the user directs image-repeat printing through the operating unit 21

(Step S203), the control unit 27 displays the thumbnail images on the display unit 22 as the preview image, and displays a caption indicating the input of printing conditions on the display unit 22 (Step S204). Then, the user operates the operating unit 21 to input the size of the recording paper, for which the image-repeat printing is performed, and magnification of the original document image with respect to the size of the recording paper as the printing conditions.

If the printing conditions are received in the operating unit 21 (Step S205), the control unit 27 determines the size and arrangement number of the thumbnail images to be arranged in a preview image area based on the printing conditions (Step S206). In addition, the control unit 27 adjusts the thumbnail images such that the thumbnail images have the determined size and generates the preview image by arranging the thumbnail images (hereinafter, referred to as preview-child images) having the adjusted size such that they are located close to each other in the preview image area but do not overlap with each other (Step S207). Herein, the preview image area corresponds to the preview display area provided in order to display the preview image on the display unit 22. For example, when the length of the main scanning direction (horizontal direction) of the preview display area corresponds to 140 pixels, the length of the main scanning direction of the preview image area corresponds to 140 pixels.

In detail, the control unit 27 includes an image-repeat image generating unit 271 and a preview image generating unit 272.

The image-repeat image generating unit 271 generates image-repeat image by arranging a plurality of the input images from the image reading unit 23 in a printing image area based on predetermined printing conditions such that they are located close to each other but do not overlap with each other and forms the image-repeat image on one sheet of the recording medium.

The preview image generating unit 272 generates a plurality of reduced images of the input images, and generates the preview image by arranging the reduced images in the preview image area such that they are located close to each other but do not overlap with each other, based on the printing conditions.

The display unit 22 displays the preview image generated by the preview image generating unit 272.

If the size of the preview image generated by the preview image generating unit 272 is different from the size of the preview image area, the preview image generating unit 272 adjusts the size of the preview image so as to coincide with the size of the preview image area.

When the input images are received from the image reading unit 23, the image storage unit 24 stores the reduced images generated by the preview image generating unit 272.

When display instructions for the preview image are received from the operating unit 21, the preview image generating unit 272 reads the reduced images from the image storage unit 24 to generate the preview image.

The image-repeat image generating unit 271 generates the image-repeat image after the preview image is generated.

Figure 7A:
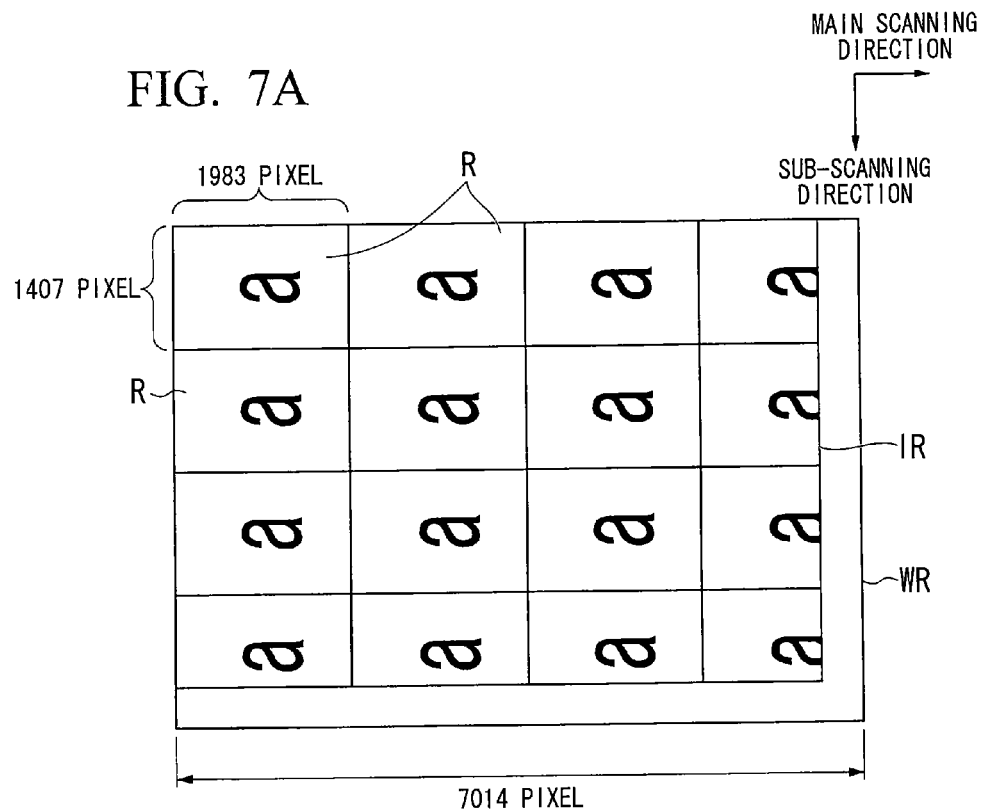
FIG. 7A is a schematic diagram illustrating the generation method of a preview image in image-repeat printing according to the second embodiment of the present invention.

Hereinafter, Steps S206 and S207 will be described in detail. FIG. 7A illustrates one example of an image-repeat image IR generated by arranging a plurality of original document images in a printing image area WR such that they are located close to each other but do not overlap with each other, based on the printing conditions. Herein, the printing image area WR corresponds to an image forming area on one sheet of the recording paper, and the size of the printing image area WR is definitely determined according to the size of the recording paper. In FIG. 7A, it is assumed that the length of the main scanning direction of the printing image area WR corresponds to 7014 pixels and the original document image is reduced to a size of 1983 pixels (main scanning direction)×1407 pixels (sub-scanning direction (vertical direction).

From the size of the reduced original document image (hereinafter, referred to as image-repeat child image R), the arrangement number of the image-repeat child images R can be calculated under the printing conditions. That is, when focusing on the main scanning direction, since 3.537 is obtained by dividing 1983 pixels by 7014 pixels, the arrangement number of the image-repeat child images R in the main scanning direction of the printing image area WR is 3.537. The arrangement number of the image-repeat child images R in the sub-scanning direction can be calculated in the same manner.

Figure 7B:
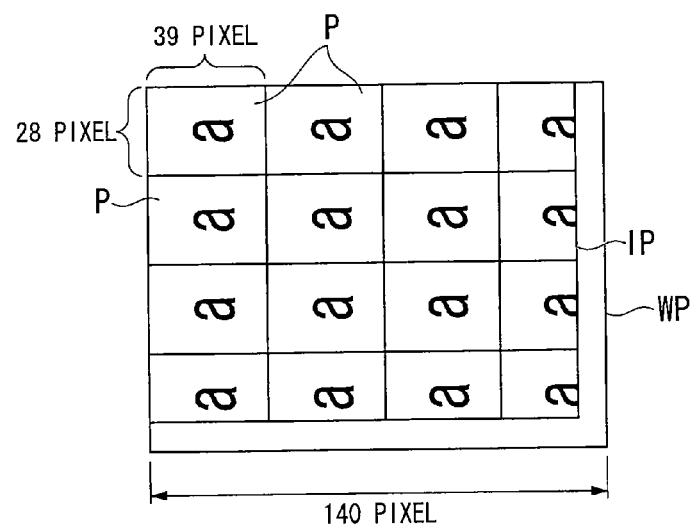
FIG. 7B is a schematic diagram illustrating the generation method of a preview image in image-repeat printing according to the second embodiment of the present invention.

The size and the arrangement number of the thumbnail images to be arranged in the preview image area WP can be determined based on the size of the printing image area WR and the arrangement number of the image-repeat child images R, which are obtained from the printing condition as described above. That is, as illustrated in FIG. 7B, if it is assumed that the length of the main scanning direction of the preview image area WP corresponds to 140 pixels, since the preview image area WP has a size corresponding to about 2% (=140 pixels/7014 pixels) of the printing image area WR, it is preferred that the size of the thumbnail images to be arranged in the preview image area WP is set to 2% of the image-repeat child image R. Thus, the size of the thumbnail image is adjusted so as to correspond to 39 pixels (=1983 pixels×2%: main scanning direction)×28 pixels (=1407 pixels×2%: sub-scanning direction), so that preview child images P to be arranged in the preview image area WP can be generated.

Further, since the arrangement number of the image-repeat child images R in main scanning direction is 3.537 from the printing conditions, if this is applied to the preview child images P, the arrangement number of the preview child images P in main scanning direction of the preview image area WP is 3.537. That is, 3.537 preview child images P are arranged in the main scanning direction of the preview image area WP such that they are located close to each other but do not overlap with each other. Further, similarly to this, the child images P are arranged in the sub-scanning direction of the preview image area WP, so a preview image IP can be generated as illustrated in FIG. 7B.

When focusing on the main scanning direction of the preview image IP generated as described above, the length of the main scanning direction of the preview image IP corresponds to 137.945 pixels which is nearly equal to 137 pixels (calculated by 39 pixels×3.537). That is, under the printing conditions, a case may occur in which the size of the preview image IP (main scanning direction: 137 pixels) is different from the size of the preview image area WP (main scanning direction: 140 pixels). In such a case, preferably, the size of the preview image IP is adjusted so as to coincide with the size of the preview image area WP. For example, in the above example, since the preview image area WP has a size corresponding to 102.1% (=137 pixels/140 pixels) of the preview image IP, it is preferred that the preview image IP is enlarged at the magnification of 102.1%.

If the preview image IP is generated as described above, the control unit 27 displays the preview image IP on the display unit 22 (Step S208). When the preview image IP is displayed on the display unit 22 as described above, a user directs the start of printing through the operating unit 21 if the preview image IP coincides with the intention of the user.

Then, if the instructions for the start of the printing are received in the operating unit 21 (Step S209), the control unit 27 outputs a control signal, which includes instructions for the generation of the image-repeat image IR based on the original document image stored in the image storage unit 24 and the printing conditions received in the operating unit 21, to the image processing unit 25, thereby controlling the image-repeat image IR to be generated (Step S210).

If the control signal is received from the control unit 27, the image processing unit 25 generates the image-repeat child images R as illustrated in FIG. 7A based on the original document image read from the image storage unit 24 and the printing conditions received from the control unit 27 as the control signal, generates the image-repeat image IR by arranging the image-repeat child images R in the printing image area WR such that they are located adjacent to each other but do not overlap with each other, and outputs the image-repeat image IR to the printing unit 26. Then, the control unit 27 outputs a control signal, which includes instructions for the execution of printing, to the printing unit 26, so that the printing unit 26 executes the printing based on the image-repeat image IR (Step S211).

As described above, according to the present embodiment, based on the printing conditions used for the generation of the image-repeat image IR, the preview image IP is generated by arranging the preview child images P (thumbnail images having the adjusted size) in the preview image area WP such that they are located close to each other but do not overlap with each other, so that the preview image IP displayed during the image-repeat printing can be more faithful to the image-repeat image IR.

The present invention is not limited to the previous embodiment. For example, the following modified examples can be made.

(2-1) According to the previous embodiment, the image-repeat image provided for the printing is generated after the preview image Y provided for the preview display is generated. However, the generation sequence of the two images is not limited thereto. Further, according to the previous embodiment, when the size of the preview image is different from the size of the preview image area, the size of the preview image is adjusted so as to coincide with the size of the preview image area. However, when it is possible to satisfy the faithfulness relative to the image-repeat image, the above process is not necessarily performed.

(2-2) According to the previous embodiment, the copy machine 20A has been used as an example of the image forming apparatus. However, the present invention can be applied to other image forming apparatuses such as printers or decoders.

Further, according to the previous embodiment, the above description has been given on the assumption that the image (original document image) of the original document read by the image reading unit 23 is regarded as the input image. However, for example, when the image forming apparatus is a printer, a printing image transmitted from an information processing apparatus such as a personal computer can be used as the input image.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The present invention can be applied to an image forming apparatus capable of obtaining a preview image which is more faithful to an image-repeat image the in image-repeat printing.

What is claimed is:

1. An image forming apparatus comprising:
   an output image forming unit that forms an output image from an image-repeat image which is obtained by arranging a plurality of input images on one recording medium based on predetermined repeat conditions, the repeat conditions including a first vertex indicating a start point, a second vertex, a third vertex, and a fourth vertex indicating an end point of a rectangular area, the repeat conditions serving as magnification for a size of an original document;
   a preview image generating unit that generates reduced images of the input images, sets arrangement positions of the reduced images based on the repeat conditions, and arranges the reduced images in the arrangement positions in accordance with the repeat conditions, thereby generating a preview image that comprise a plurality of preview child images;
   a display unit that displays the preview image generated by the preview image generating unit; and
   a control unit that calculates coordinates of the second vertex and the third vertex of the rectangular area based on coordinates of the start point and coordinates of the end point of the rectangular area, the control unit calculates the coordinates of first vertexes, second vertexes, third vertexes, and fourth vertexes of preview child images based on the coordinates of the start point, the second vertex, the third vertex, and the end point of the rectangular area and based on the magnification designated as the repeat conditions, the control unit generates the preview child images, which are obtained by enlarging or reducing the rectangular area designated by the coordinates of the start point, the second vertex, the third vertex, and the end point of the rectangular area of the repeat conditions according to the magnification, the control unit calculates attachment positions of the preview child images based on the coordinates of first vertexes, second vertexes, third vertexes, and fourth vertexes of preview child images, the control unit attaches the preview child images to the attachment positions to generate the preview image for image-repeat printing, and the control unit thereby displaying the preview image on the display unit.

2. The image forming apparatus according to claim 1, further comprising an image storage unit that stores the reduced images generated by the preview image generating unit when the input images are received, wherein the preview image generating unit reads the reduced images from the image storage unit to generate the preview image if display instructions for the preview image are received.

3. The image forming apparatus according to claim 1, wherein the output image forming unit generates the output image after the preview image is generated.

* * * * *